(12) United States Patent
Kawasaki (10) Patent No.: US 6,985,106 B2
(45) Date of Patent: Jan. 10, 2006

(54) ARRAY ANTENNA RADIO COMMUNICATION APPARATUS

(75) Inventor: Toshio Kawasaki, Yokosuka (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 10/921,201

(22) Filed: Aug. 19, 2004

(65) Prior Publication Data
US 2005/0219122 A1  Oct. 6, 2005

(30) Foreign Application Priority Data
Mar. 30, 2004 (JP) .............................. 2004-099299

(51) Int. Cl.
*G01S 3/16* (2006.01)
(52) U.S. Cl. .................................................. 342/378
(58) Field of Classification Search ................ 342/368, 342/373, 378, 383; 375/148, 150; 455/119, 455/121
See application file for complete search history.

(56) References Cited

U.S. PATENT DOCUMENTS

| | | | | |
|---|---|---|---|---|
| 6,670,919 B2 * | 12/2003 | Yoshida | ....................... | 342/378 |
| 6,683,924 B1 * | 1/2004 | Ottosson et al. | ............ | 375/343 |
| 2002/0187814 A1 * | 12/2002 | Yoshida | ....................... | 455/562 |
| 2003/0012267 A1 * | 1/2003 | Jitsukawa et al. | .......... | 375/148 |
| 2003/0210670 A1 * | 11/2003 | Kisigami et al. | ........... | 370/335 |
| 2003/0220082 A1 * | 11/2003 | Yoshida | ....................... | 455/121 |
| 2003/0228887 A1 * | 12/2003 | Kishigami et al. | .......... | 455/561 |
| 2004/0174300 A1 * | 9/2004 | Nakagawa | .................. | 342/377 |

FOREIGN PATENT DOCUMENTS

| EP | 1 231 720 A | 8/2002 |
|---|---|---|
| EP | 1 265 377 A | 12/2002 |
| JP | 2002 084216 A | 3/2002 |

* cited by examiner

*Primary Examiner*—Dao Phan
(74) *Attorney, Agent, or Firm*—Swidler Berlin LLP (57) ABSTRACT

A searcher unit realizes stable operation of the a communication system and improves system capacity by improving path detection characteristics in the baseband processing unit of a receiving apparatus using an array antenna. An array antenna radio communication apparatus comprises a searcher unit operable to receive signals from at least a portion of an array antenna having a plurality of antenna elements and operable to detect a path-timing of the received signals, the searcher unit comprising a correlation unit operable to obtain first correlation values as correlation values of the received signals, an antenna-to-antenna correlation unit operable to obtain second correlation values as correlation values of the first correlation values, and a path-timing detecting unit operable to detect path-timing based on amplitude information obtained from the second correlation values, and a signal processing unit operable to execute despreading of signals received from the antenna elements based on the path-timing obtained from the searcher unit.

12 Claims, 6 Drawing Sheets

ARRAY ANTENNA RADIO COMMUNICATION APPARATUS

BACKGROUND OF THE INVENTION

1. Field of the Invention

The present invention relates to a radio communication apparatus utilizing an array antenna and a method of detecting path-timing thereof and particularly to a structure for processing the baseband signal.

2. Description of the Related Art

As the mobile communication system for the next generation, development of a digital cellular radio communication system utilizing the DS-CDMA (Direct Spread Code Division Multiple Access) technology is now under way.

The CDMA system has been proposed to realize simultaneous communications by assigning channels using codes. In this system, the signals from the other channels under simultaneous communications generate interference and thereby the number of channels for simultaneous communications (capacity of channel) is restricted as a result.

That is, in a mobile communication system utilizing the DS-CDMA technology, communication quality (average bit error rate during digital communication) is deteriorated by the amount of interference from the other users having multiple connections and the system capacity is determined based on the number of multiple access users satisfying the predetermined communication quality.

Accordingly, adaptation of interference suppressing technology is effective for increasing the channel capacity.

Adaptive array antenna is a technology which can be adaptively introduced for beam forming to the desired users and null point forming to the user who generates a large interference source and is also a technology to enable an increase in the channel capacity.

Namely, radio signals can be received at higher sensitivity from the desired user by forming the signal beam in the direction of the desired user and directing the null point to the user who is a large interference source.

The channel capacity can be increased by reducing amount of interference as described above.

Moreover, in the CDMA communication system in a mobile communication environment, system capacity may be lowered due to the differences in the distances to the base station from many users who are communicating with only one base station.

Therefore, system capacity can be increased by controlling the transmitting power to equalize the received power of each user of the base station.

When the array antenna is adapted to the DS-CDMA system to execute transmit power control, the transmit power control is performed to make constant the SIR (signal to interference power ratio) after beam forming and RAKE combining.

Figure 6:
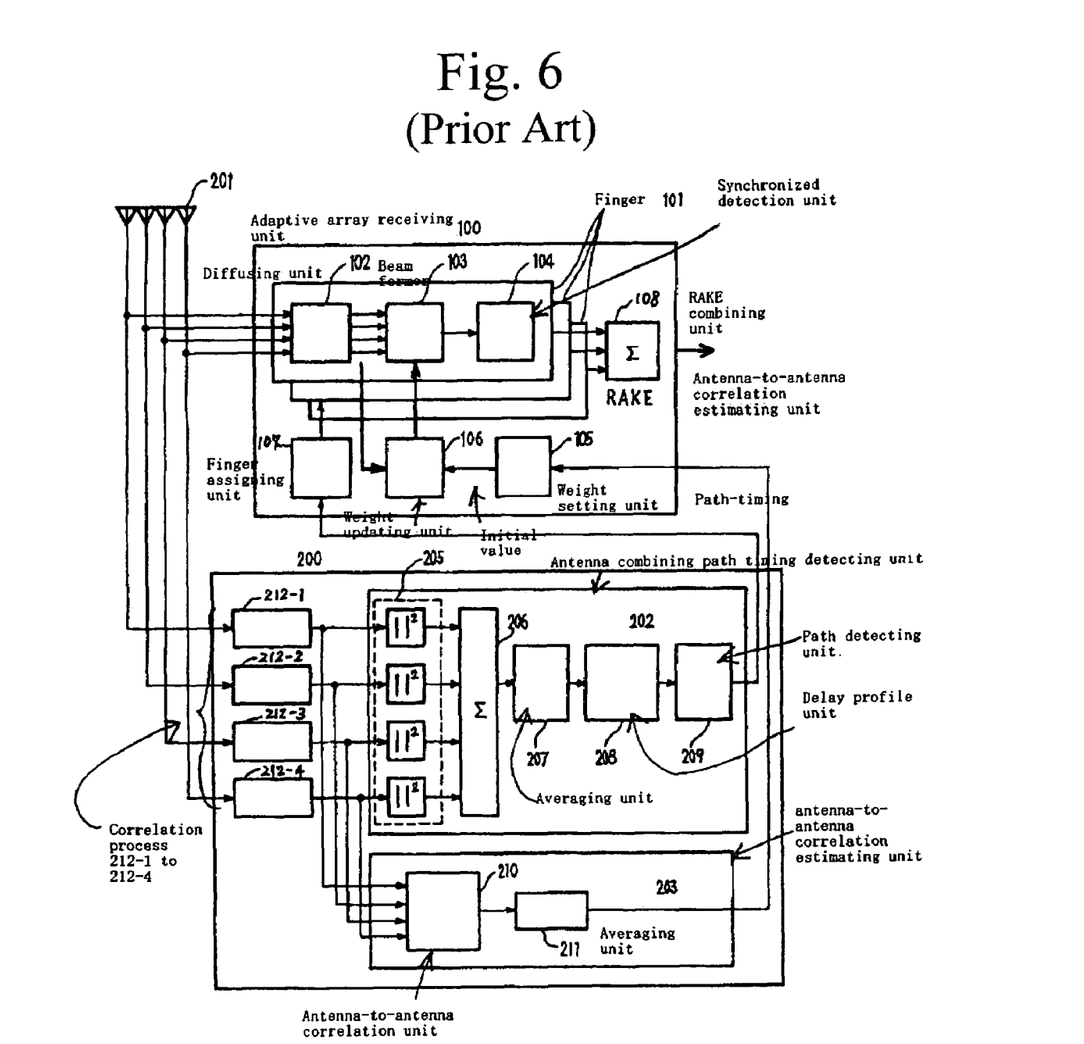
FIG. 6 illustrates a prior art of a structure of a baseband signal processing unit of the existing DS-CDMA array antenna receiving apparatus shown in Japanese Published Unexamined Patent Application No. 84216/2002.

FIG. 6 illustrates a prior art of a structure of a baseband signal processing unit of the existing DS-CDMA array antenna receiving apparatus shown in Japanese Published Unexamined Patent Application No. 84216/2002.

The radio frequency signal received with each antenna element of the array antenna 201, consisting of a plurality of antenna elements, is converted to the baseband signal in a frequency converting unit and is then converted, by an A/D converter to the discrete/quantized digital baseband signal (not illustrated).

The digital baseband signal is then input to an adaptive array receiving unit 100 for executing the beam forming and demodulation process and a searcher 200 to execute the path-search.

The adaptive array receiving unit 100 is formed of a plurality of fingers 101 for receiving a multi-path signal with the RAKE receiving method and each finger 101 is provided, for the receiving signal process of each path, with a despreading unit 102, a beam former 103 and a coherent detecting unit 104 to execute the receiving signal process of each path.

The RAKE reception is performed by coherently combining the output signals demodulated by the fingers 101 in the RAKE combining unit 108.

Moreover, a weight updating unit 106 using an adaptive algorithm is also included in the adaptive beam forming in accordance with the receiving environment. Since the weight updating algorithm of this weight updating unit 106 is well-known, a detailed description is omitted here.

According to this known weight updating algorithm, the amount of interference can be reduced by directing the beam to the desired direction and moreover directing the null point to the direction of other users having the larger interference power.

The beam former 103 adjusts the relative phase of the received signal or transmitted signal and then changes the direction in which the transmit/receive intensity of the signal transmitted from the array antenna is most intensive (direction of beam forming) by multiplying a weight expressed with a complex number to the signal from each antenna element.

The weight updating unit 106 updates a value of weight used by the beam former 103 and then gives this updated value to the beam former 103 in order to optimize the direction of beam formed by the beam former 103.

Meanwhile, the signals of the array antenna 201 input to the searcher 200 are converted to complex correlation value signals through a correlation process for despreading process for every antenna element with the correlation processing units 212-1, 212-2, 212-3, 212-4 and are then input to an antenna combining path-timing detecting unit 202 and an antenna-to-antenna correlation estimating unit 203.

In the antenna combining path-timing detecting unit 202, the complex correlation value signals present after the correlation process of each antenna are converted to the value of powers by a power value converter 205 and are then combined with a combiner 206.

Accordingly, large signals of almost the same level can be obtained among the antenna elements at the time when the path exists, but when the path does not exist, and noise is appearing, random signals of lower levels are combined. As a result, the signal element is multiplied with the number of antennas, but noise is not multiplied with the number of antennas and is equalized to an average value. Therefore, the distribution of noise for the signal after combining is suppressed in comparison with that before combining.

The signal obtained by combining the complex correlation values for every antenna element is performed to a temporal average by accumulating the values of powers at the predetermined time in an averaging unit 207 and delay profiles are stored into a delay profile unit 208 after the averaging process of variations resulting from fading in each path.

The path-timing detection is executed by searching the path in the larger level in the path detecting unit 209 using the delay profile.

In the antenna-to-antenna correlation estimating unit 203, the antenna-to-antenna correlation value (the cross-correlation value between the received signals by adjacent antenna elements) is estimated in the antenna-to-antenna correlation unit 210 and the estimated antenna-to-antenna correlation value is performed to a temporal average in the averaging unit 211. Thereby, variation in the level of the path due to fading can be compensated.

As the output of the averaging process by the averaging unit 211, an antenna-to-antenna correlation estimating value corresponding to each timing of the delay profile can be obtained.

In the adaptive array receiving unit 100, the phase term information of the antenna-to-antenna correlation estimating value obtained from the searcher 200 is converted to weight information in a weight converting unit 105 and is set as an initial value of the weight updating unit 106.

A plurality of path-timing information pieces detected by the searcher 200 are sent to a finger assigning unit 107 of the adaptive array receiving unit 100 and is used as the despreading timing of each finger 101.

In the prior art, the path-timing detection is performed with a correlation process for each antenna element in the searcher, conversion of the obtained complex correlation values to the powers, and then combining (adding) of these powers.

The reason is that since the complex correlation value of each antenna element generates phase rotation due to variation in frequency (Doppler, carrier frequency variation or the like) of the receiving signal, when the complex correlation values of antenna elements are all added in voltage, namely added as vectors, the values after the combining process may be deteriorated in accordance with the complex correlation values to be added and therefore the complex correlation values of antenna elements cannot be added as vectors.

Accordingly, the complex correlation values must be converted to powers in view of eliminating influence by phase rotation.

As described above, frequency variation must be taken into consideration in the prior art and the averaging process is executed after conversion to power values in the length of a temporal average where frequency variation cannot be neglected.

Moreover, in the prior art, the delay profile is obtained by conducting the temporal averaging process after the correlation process (corresponding to the despreading process) is executed, using a replica of the spread code and the receive signal in the searcher. However, the receive signal vector is rotated by the modulation data.

Therefore, the polarity of symbols must be cancelled in the case where the temporal average process is executed for a plurality of symbols and only the known pilot symbol part can usually be used and only a small number of samples may be used.

Therefore, a need arises for a technique that can realize stable operation of the system and improve system capacity through improvement in the path detection characteristics and that can improve the noise cancellation effect.

SUMMARY OF THE INVENTION

An object of the present invention is therefore to realize stable operation of system and improve system capacity through improvement in the path detection characteristics when the array antenna is adapted by providing a circuit configuration of the searcher to realize high speed beam forming in the baseband processing unit comprised in the receiving apparatus utilizing the array antenna.

Moreover, another object of the present invention is to improve the noise cancellation effect by providing a circuit configuration to be capable of neglecting phase rotation of the receiving signal due to frequency variation and modulation data by canceling the phase rotation.

The array antenna radio communication apparatus of the present invention comprises a searcher means for receiving signals from a part or the entire part of the array antenna having of a plurality of antenna elements and for detecting the path-timing of the received signals and a signal processing means to execute despreading of signals received from the antenna elements on the basis of the path-timing obtained from the searcher means, wherein the searcher means also comprises a correlation means for obtaining first correlation values as the correlation values in the received signals, an antenna-to-antenna correlation means for obtaining second correlation values as the correlation values of the first correlation values, and a path-timing detecting means for detecting the path-timing on the basis of an amplitude information obtained from the second correlation values.

The searcher means of the array antenna radio communication apparatus described above comprises an antenna-to-antenna correlation processing means for obtaining the phase difference information and the amplitude information among antenna elements on the basis of the second correlation values obtained through combining of the correlation values between the first correlation values, and a phase difference detecting means for giving a weight to a beam former means to form the signal beam of the array antenna on the basis of the phase difference information.

Moreover, the array antenna radio communication apparatus described above may introduce the structure of comprising a transmitting beam forming means to form the transmitting beam on the basis of the second correlation values obtained with the antenna-to-antenna correlation means.

According to the present invention, the arrival direction of radio waves from users can be estimated and the power value of signals can also be detected by obtaining a correlation value of the signals from each antenna element of the array antenna and then obtaining correlation value between the antennas. Therefore, scale of circuit can be reduced because calculation of power value and process for averaging with the other circuits are no longer required unlike the prior art.

In addition, since the phase of the antenna-to-antenna complex correlation value does not depend on the carrier frequency variation of the receiving signal and the modulation signal, but only on the arrival direction of signals, the averaging process can be realized by addition of vectors of the antenna-to-antenna correlation values (the cross-correlation value between the received signals by adjacent antenna elements) and thereby deterioration of path detecting accuracy can be prevented.

Moreover, since the searcher detects the path and estimates the arrival direction using an antenna-to-antenna complex correlation value delay profile obtained with addition of vectors, it can perform the stable path searcher operation of the system to which the array antenna is adapted.

Moreover, since vector rotation due to frequency variation is not generated by taking an antenna-to-antenna correlation value and the phase of vectors is constant not depending on the modulation data, not only the known pilot symbol part but also unknown modulation data part can be utilized, the number of samples for the averaging process can be increased, the noise cancellation effect can also be improved, and quality of the receiving signal and transmitting signal may be kept in the higher quality.

Moreover, since the phase of vectors is kept constant, the pilot pattern canceling process (the pilot bit mask process) is not required even for obtaining the temporal average of a plurality of symbols using the known pilot patterns and the noise canceling effect can further be enhanced.

Owing to the effects described above, increase in the transmitting power generated by deterioration of path searching characteristics and incomplete beam forming can be suppressed when the array antenna is adapted to the CDMA mobile communication system.

Accordingly, the system capacity can be increased without deterioration of characteristics when the array antenna is adapted in the CDMA system in which the system capacity is restricted by amount of interference from the other users.

DETAILED DESCRIPTION OF THE PREFERRED EMBODIMENTS

The preferred embodiments of the present invention will be described with reference to the accompanying drawings.

Figure 1:
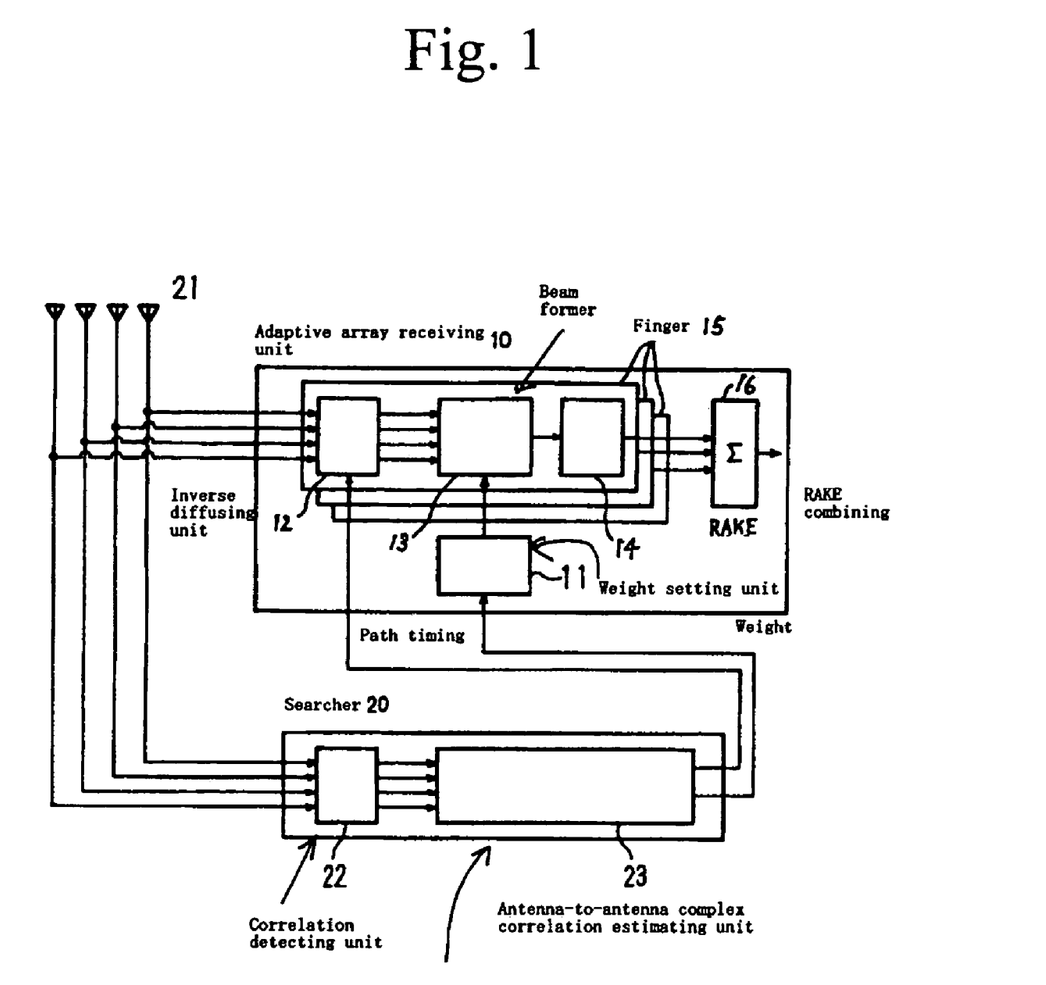
FIG. 1 is a diagram for describing the principle of a preferred embodiment of the present invention.

FIG. 1 is a diagram for describing the principle of a preferred embodiment of the present invention.

All signals of the array antenna 21 consisting of a plurality of antenna elements is inputted to a searcher 20. After the correlation process for despreading is conducted for each antenna element in the correlation detecting unit 22 of the searcher 20, the signals are inputted to an antenna-to-antenna correlation estimating unit 23.

In the antenna-to-antenna correlation estimating unit (antenna-to-antenna correlation processing unit) 23, the antenna-to-antenna correlation value is estimated using the signal obtained by combining (adding) the complex correlation value signals after the correlation processes of antennas in order to perform the path-timing detection and phase difference extraction (calculation of weight information using phase difference).

The interface between an adaptive array receiving unit 10 and the searcher 20 is provided with a path-timing signal and a weight signal.

The adaptive array receiving unit 10 is formed of a plurality of fingers 15 for the RAKE reception of the multi-path signal. Each finger 15 comprises an despreading unit 12, a beam former 13, and a coherent detecting unit 14 and performs the receiving signal process of each path.

The RAKE reception can be realized through the coherent combining of the output signals demodulated with each finger 15 in the RAKE combining unit 16.

Moreover, the weight information obtained from the searcher 20 is set to a weight setting unit 11.

Figure 2:
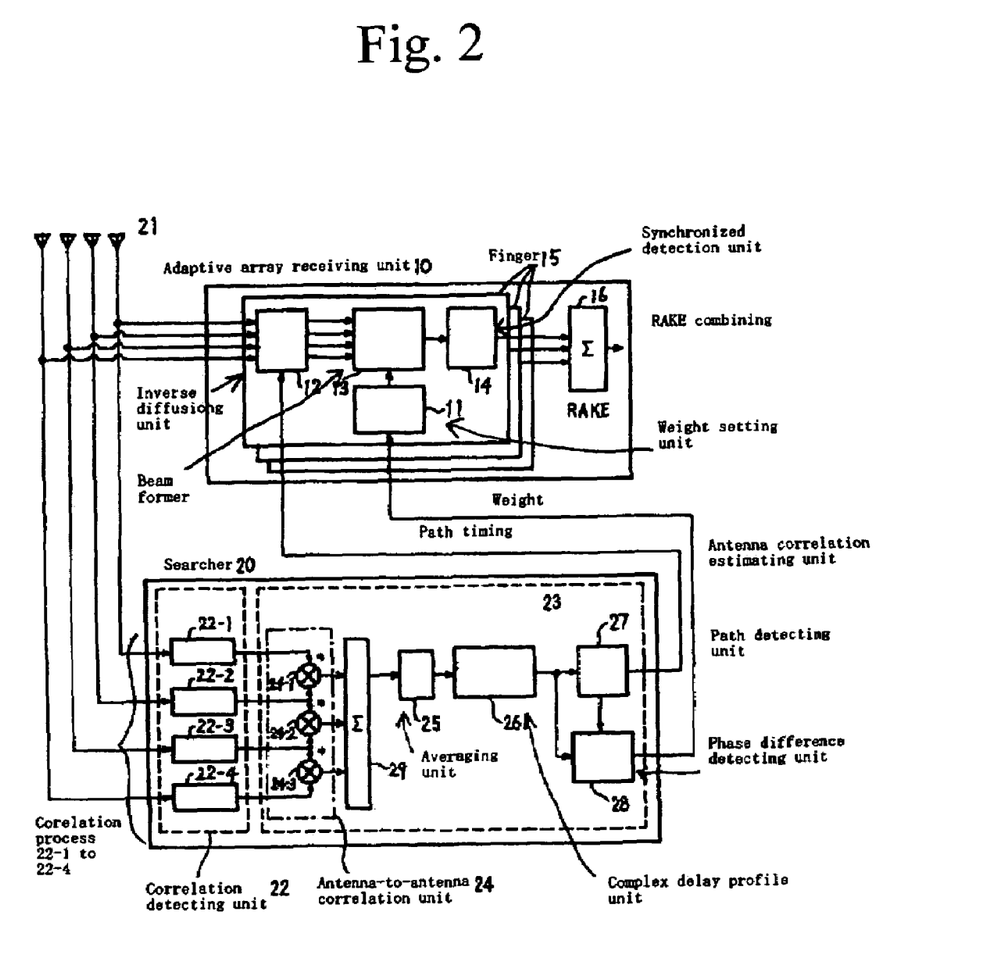
FIG. 2 is a diagram illustrating an embodiment of an array antenna receiver structure of the present invention.

FIG. 2 is a diagram illustrating an embodiment of an array antenna receiver structure of the present invention.

A radio frequency signal received by each antenna element of the array antenna 21 is converted to a baseband signal in a frequency converting unit and is then converted to the digital baseband signal through discretion and quantization in an A/D converting unit (not illustrated).

The digital baseband signal is then inputted to an adaptive array receiving unit 10 for conducting beam forming and demodulation process and the searcher 20 for path-searching.

In the searcher 20, the signals of a plurality of antenna elements of the array antenna 21 are inputted.

The signals of a plurality of antenna elements of the array antenna 21 are inputted to a correlation detecting unit 22 and is then inputted to an antenna-to-antenna correlation estimating unit 23 as the complex correlation signals through the correlation process for the despreading process in each antenna.

In the antenna-to-antenna correlation estimating unit 23, the complex correlation value of a certain antenna element is multiplied to the complex conjugate of the complex correlation value of the adjacent reference antenna element in the antenna-to-antenna correlation unit 24 in view of obtaining the correlation between the complex correlation signals from the antenna elements. As a result, the antenna-to-antenna correlation value can be obtained.

A large signal in almost the equal level among the antenna elements at the time when the path exists can be obtained by adding (combining process) the correlation values among the antenna elements obtained in the combining unit 29. Namely, the signal element can be increased up to the value multiplied by the number of antenna elements.

Meanwhile, when the path does not exist, the noise, namely small level signal is combined at random and the signals are averaged without multiplication with the number of antenna element. Distribution of noise for the combined signal is suppressed for that before the combining.

The signal obtained by combining the antenna-to-antenna correlation values compensates for variation in the path-level such as the fading through temporal averaging in the averaging unit 25. Thereby, accuracy in the estimation of the antenna-to-antenna correlation can be improved.

This antenna-to-antenna correlation value is expressed with a vector having constant value of amplitude and phase which does not depend on the modulation data.

An output value of the averaging process in the averaging unit 25 can also be obtained as the antenna-to-antenna correlation value.

Here, the antenna-to-antenna correlation of the present invention will be described with reference to FIGS. 3A to 3G.

FIGS. 3A to 3G illustrates an antenna structure of the linear array antenna, in which four antenna elements are used.

The complex correlation signal of each antenna element obtained by the correlation process of FIG. 2 having the amplitude R which is equal to the length of vector r (R=r) as illustrated in FIGS. 3A to 3D. Length of each vector is equal.

Moreover, the phase □ is generating a phase difference of □□ determined by the angle of arrival.

Next, an antenna-to-antenna complex correlation value is obtained from the complex correlation signal of each antenna element.

Figure 3:
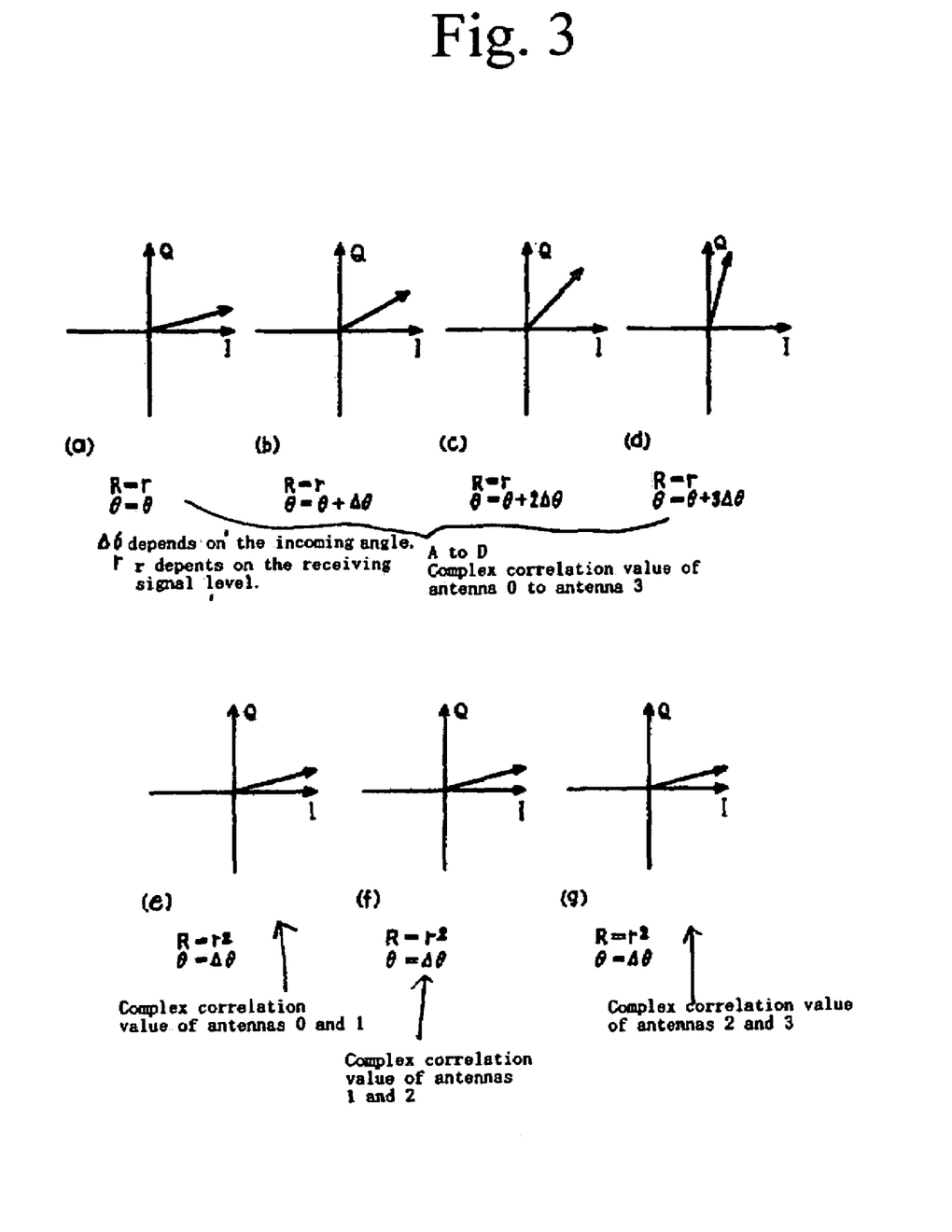
FIGS. 3A to 3G illustrates an antenna structure of the linear array antenna, in which four antenna elements are used.

FIGS. 3E to 3G illustrate the antenna-to-antenna complex correlation values of the antenna elements 0 and 1, antenna elements 1 and 2, and antenna elements 2 and 3. The antenna-to-antenna complex correlation values are all indicating the amplitude R=r2, and phase □=□□.

Accordingly, the antenna-to-antenna complex correlation values obtained by the complex correlation process have the equal vector. The amplitude indicates a signal power value and the phase indicates the arrival direction.

With the calculation described above, all complex correlation values have the equal vector in the structure of the linear array antenna. Therefore, the noise element is averaged by combining the vectors and the antenna-to-antenna complex correlation values are added. Thereby, the noise cancellation effect can be attained.

As described above, the phase of the antenna-to-antenna complex correlation value signal and an output of the averaging unit 25 in FIG. 2 indicates the arrival direction, while the amplitude thereof, the signal power.

This antenna-to-antenna complex correlation value signal is stored to a complex delay profile unit 26.

The path detecting unit 27 detects the path-timing exceeding the path detection threshold value on the basis of the delay profiles stored in the complex correlation profile unit 26 and transmits the timing pulse synchronized with the time of path.

Meanwhile, the phase difference detecting unit 28 calculates a phase difference of the detected path, namely the angle of arrival on the basis of the phase information of the antenna-to-antenna complex correlation value stored in the complex correlation delay profile unit 26 and the detection information from the path detecting unit 27, thereafter converts the data to the weight information with the calculation or using a table, and then transmits the weight information as the weight for beam forming.

Here, the searcher 20 calculates the weight itself and then transmits the weight to the adaptive array receiving unit 10. However, it is also possible that the phase difference information is transmitted from the phase difference detecting unit 28 and it is then converted to the weight in the weight setting unit 11.

Each finger 15 of the adaptive array receiving unit 10 executes despreading by conducting the correlation process of the receiving signal and the spread code in the despreading unit 12 on the basis of the path-timing signal (timing pulse) transmitted from the path detecting unit 27.

Using the weight from the phase difference detecting unit 28 corresponding to the path-timing signal transmitted from the path detecting unit 27, the demodulation processes, such as coherent detection in the coherent detection unit 14 and RAKE combining in the RAKE combining unit 16 are conducted with the beam forming signal in the beam former 13.

In this embodiment, the weight calculated from the phase difference information is steadily used in the searcher 20, but it is also possible that the weight calculated by the searcher 20 is set as the initial value and thereafter the weight is updated in the weight setting unit 11 using the known algorithm.

Moreover, in this embodiment, the common weight setting unit 11 is provided for all fingers, but it is also possible that different weights are respectively provided for each finger corresponding to each path.

The antenna-to-antenna complex correlation value in this embodiment does not depend on frequency variation of the receiving signal.

Accordingly, it is not required to convert the antenna-to-antenna complex correlation value to an electrical power value and the combining process in the combining unit 29 can be realized with the vector adding process and the noise canceling effect can be improved more than that in the electrical power value combining process.

Moreover, since the antenna-to-antenna complex correlation value does not depend on the modulation data, the pilot pattern canceling function which has been essential in the prior art is not longer required and the signal other than the known pilot patterns can also be used, further resulting in improvement in the noise canceling effect.

Figure 4:
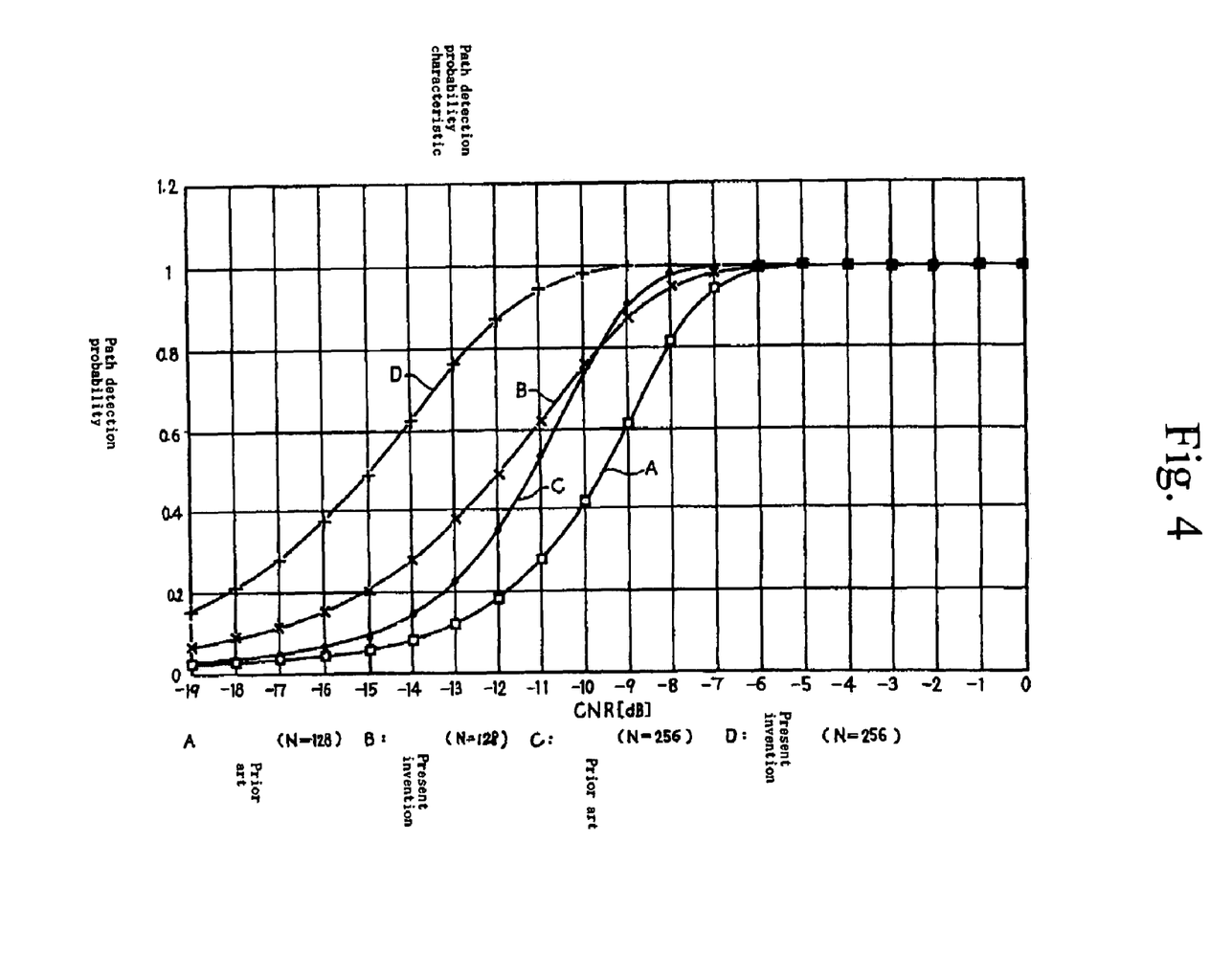
FIG. 4 illustrates the path detection probability characteristic (calculation result) for the CNR (carrier to noise power ratio) in the embodiment of the present invention illustrated in FIG. 2.

FIG. 4 illustrates the path detection probability characteristic (calculation result) for the CNR (carrier to noise power ratio) in the embodiment of the present invention illustrated in FIG. 2.

The characteristics A, C correspond to the receiving system which is different from that of the present invention (combining the power value of the antenna elements), while the characteristics B, D correspond to the embodiment of the present invention.

As the calculation parameters in the case of combining the power value of the antenna elements, the number of antenna elements is set to 2, spreading factor is set to 256 and the pilot symbol is set to 4 symbols. In this case, the gain based on the spread gain and coherent combining becomes 30 dB (correlation process output of the searcher 200 in FIG. 6). When the CNR of the receiving signal is assumed as −30 dB, the CNR=0 dB can be obtained at the power conversion point.

Moreover, when the multiplication of the integral length and the number of antenna elements is defined as N, Chi-Square Distribution of the degrees of freedom n=2 (I.Q) □ N (integral length).

On the other hand, in the embodiment of the present invention, the spread gain and the gain based on the coherent combining (output of correlation detecting unit 22 in FIG. 2) are identical to that in the combining the power value of the antenna elements and the CNR at the input point of complex multiplier for obtaining the antenna-to-antenna correlation value becomes 0 dB as in the case of the structure in the combining the power value of antenna elements.

The CNR generates deterioration of 3 dB in the complex multiplier of the antenna-to-antenna correlation unit 24 of FIG. 2.

Next, the integral process is executed in the averaging unit 25. When the integral length is defined as N, an improvement coefficient of the CNR is expressed with □N and the square of the vector length (square of the amplitude) is obtained thereafter. However, distribution of this correlation energy is indicated by Chi-Square Distribution of the degrees of freedom n=2.

The characteristics A, B corresponds to N=128, while the characteristics C, D, to N=256. Therefore, it is the effect of the present invention to make clear the probability of path detection for deterioration of the CNR.

As indicated by the characteristics A, B or characteristics C, D, the probability of path detection for deterioration of the CNR in the present invention is improved in comparison with that of the prior art.

Moreover, it can also be understood that when the integral length is doubled as indicated by the characteristics A, C, improvement in the path detection probability is about 2 dB. Moreover, when the integral length is doubled in the characteristics B, D in the embodiment of the present invention, improvement in the path detection probability is 3 dB.

Namely, it can be understood that the characteristics are improved to a large extent for the combining the power value of the antenna elements in the prior art because the path detection probability is considerably improved in the present invention.

Figure 5:
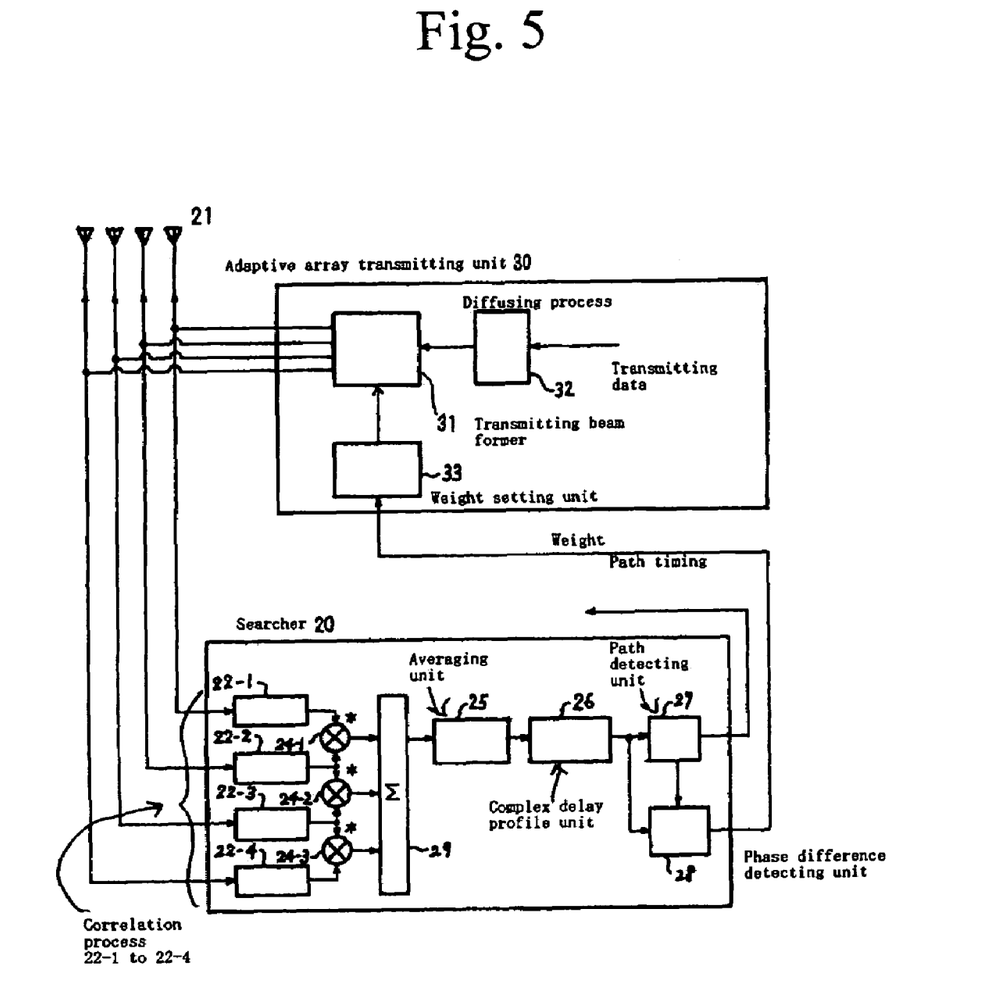
FIG. 5 illustrates another embodiment of the array antenna communication apparatus structure of the present invention.

FIG. 5 illustrates another embodiment of the array antenna communication apparatus structure of the present invention.

The signals received by the array antenna 21 are converted to the baseband signal in the frequency converter not illustrated and then converted again to the digital baseband signal through discretion and quantization in the A/D converting unit.

The digital baseband signal is inputted to the searcher 20 for conducting the search of path.

The searcher in this embodiment of the present invention obtains phase difference of the detected paths with the structure and process which are similar to that of FIG. 2.

The phase difference of the complex correlation value obtained indicates the angle of arrival and high speed transmitting beam forming may be realized by using such phase difference as the weight of transmitting beam by converting it to the weight.

For transmission of the transmitting signal, since a terminal clearly exists in the arrival direction of the receiving signal, the beam of transmitting signal can be formed for the arrival direction of the receiving signal.

The transmitting beam forming process is conducted in the transmitting beam former 31.

In this case, since only one transmitting beam is usually formed, the antenna-to-antenna correlation value of the path of the maximum correlation value detected by the searcher 20 is used.

The adaptive array transmitting unit 30 including the transmitting beam former 31 comprises the spread processing unit 32 for spread process of the transmitting data, transmitting beam former 31, and weight setting unit 33.

Detection of the arrival direction can also be utilized in a base station to provide the management information to an operator to detect the accommodation condition of users.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An array antenna radio communication apparatus comprising:
a searcher unit operable to receive signals from at least a portion of an array antenna having a plurality of antenna elements and operable to detect a path-timing of the received signals, the searcher unit comprising a correlation unit operable to obtain first correlation values as correlation values of the received signals, an antenna-to-antenna correlation unit operable to obtain second correlation values as correlation values of the first correlation values, and a path-timing detecting unit operable to detect path-timing based on amplitude information obtained from the second correlation values; wherein
the receiving antenna comprises a noise cancellation circuit configuration, capable of neglecting phase rotation of the received signal; and
a signal processing unit operable to execute despreading of signals received from the antenna elements based on the path-timing obtained from the searcher unit.

2. The array antenna radio communication apparatus according to claim 1, wherein the antenna-to-antenna correlation processing unit is further operable to obtain phase difference information and amplitude information among the antenna elements based on the second correlation values.

3. The array antenna radio communication apparatus according to claim 2, wherein the searcher unit further comprises a phase difference detecting unit operable to give a weight to a beam former to form a signal beam of the array antenna on the basis of phase difference information.

4. The array antenna radio communication apparatus according to claim 3, wherein the phase detecting unit further comprises a weight setting unit operable to update the weight on a real-time basis.

5. The array antenna radio communication apparatus according to claim 4, wherein the antenna-to-antenna correlation processing unit is further operable to convert the phase difference information obtained based on the second correlation value to a weight and to transmit the converted weight to the weight setting unit.

6. The array antenna radio communication apparatus according to claim 4, wherein the antenna-to-antenna correlation processing unit is further operable to transmit the phase difference information obtained based on the second correlation value to the weight setting unit and the weight setting unit is operable to convert the phase difference information to a weight.

7. The array antenna radio communication apparatus according to claim 1, wherein the signal processing unit further comprises a plurality of fingers, each of which is provided with a beam former and a weight setting unit.

8. The array antenna radio communication apparatus according to claim 7, wherein the antenna-to-antenna correlation processing unit is further operable to obtain a second correlation value for each path and to independently provide a weight for beam formation to each finger using the second correlation value corresponding to each path.

9. The array antenna radio communication apparatus according to claim 7, wherein the antenna-to-antenna correlation processing unit is further operable to obtain an average value for a time of the second correlation value combined among the antenna elements.

10. The array antenna radio communication apparatus according to claim 1, wherein the signal processing unit further comprises a plurality of fingers, each of which is provided with a weight setting unit, and the signal processing unit is further operable to obtain the second correlation value obtained by the antenna-to-antenna correlation means and to provide a weight for the formation of an identical beam to fingers of a same channel.

11. The array antenna radio communication apparatus according to claim 1, further comprising a transmitting beam forming unit operable to form the transmitting beam based on the second correlation values obtained with the antenna-to-antenna correlation means.

12. An array antenna radio communication apparatus, comprising:
a searcher unit operable to receive signals from at least a portion of an array antenna having a plurality of antenna elements and operable to detect a path-timing of the received signals, the searcher unit comprising an antenna-to-antenna correlation process unit operable to obtain a first correlation value through a correlation process of the receive signal of each antenna element of the array antenna, obtain phase difference information and amplitude information among the antenna elements based on a second correlation value obtained by combining correlations among the antenna elements, detect a path-timing based on the amplitude information, and calculate a weight used for beam forming; wherein the receiving antenna comprises a noise cancellation circuit configuration, capable of neglecting phase rotation of the received signal; and a signal processing unit operable to perform despreading of the signal received from the antenna elements based on a path-timing obtained from the searcher unit and operable to conduct beam forming of the array antenna, wherein the searcher means is provided with.

* * * * *